(No Model.)

R. W. HARDIE.
DISK HARROW.

No. 453,284. Patented June 2, 1891.

Sec. 1-1.

WITNESSES:
John W. Fisher
Fred. I. Lawrence

INVENTOR
Robert W. Hardie

UNITED STATES PATENT OFFICE.

ROBERT W. HARDIE, OF ALBANY, NEW YORK, ASSIGNOR TO SAMUEL C. COBB, OF JANESVILLE, WISCONSIN.

DISK-HARROW.

SPECIFICATION forming part of Letters Patent No. 453,284, dated June 2, 1891.

Application filed November 15, 1890. Serial No. 371,524. (No model.)

*To all whom it may concern:*

Be it known that I, ROBERT W. HARDIE, a citizen of the United States, residing at Albany, in the county of Albany and State of New York, have invented certain new and useful Improvements in Disk Harrows; and I do hereby declare the following to be a full, clear, and exact description of the invention, such as will enable others skilled in the art to which it appertains to make and use the same.

My invention has for its object to provide means for limiting the upward movement of the free ends of a disk-gang, and also for sustaining the end pressure exerted on said gang when set at an angle to the line of progression of the machine. This I accomplish by substantially the means illustrated in the accompanying drawings, in which—

Figure 1:
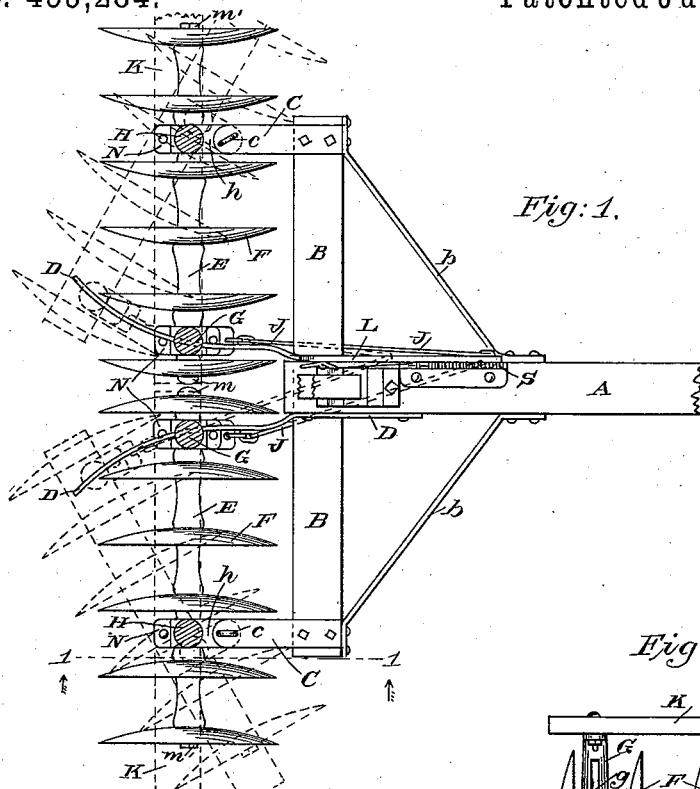
Figure 3:
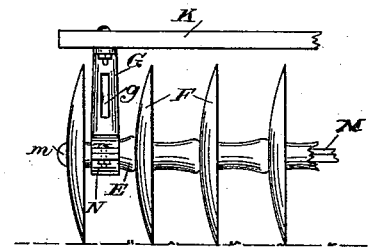
Figure 2:
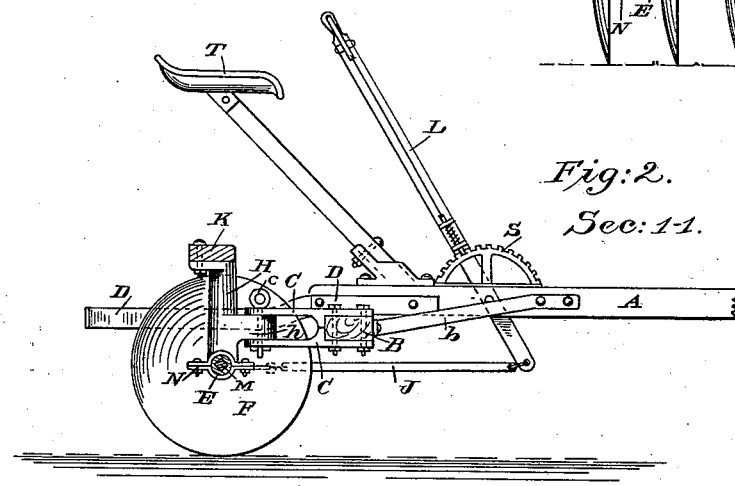

Figure 1 is a plan view of a disk harrow embodying my invention. Fig. 2 is a vertical section of the same, taken on line 1 1 of Fig. 1, showing also a side view of some of the parts. Fig. 3 is a rear view of one end of a disk-gang.

As illustrated in the drawings, the main frame of the harrow is composed of a pole A, a cross-bar B, secured to the pole and projecting laterally therefrom, braces *b*, secured to the pole and outer ends of the cross-bar, and draft-bars C, extending rearwardly from the cross-bar.

Each disk-gang is shown as consisting of a series of cutting-disks F and separating-spools E, mounted upon an axle-rod M, which is provided at one end with an enlarged head *m* and at the other end with a threaded nut *m'*, by means of which the disks and spools are secured in place. The disk-gangs are also provided with standards G and H, having a bar K, secured to their upper ends and bearing-boxes N on their lower ends adapted to engage with the spools E and form journal-bearings for the disk-gangs. The disk-gangs are arranged in rear of the main frame and may be pivoted to said frame in any suitable manner which will permit of both vertical and lateral movement of the free ends of the gangs. In this instance I have formed a lug *h* on the standard H, which is interposed between the upper and lower draft-bars C. A pin *c* is passed vertically through a hole formed in the lug *h* and on the rear ends of the bar C, so as to form a hinge connection allowing the free end of the disk-gang to be moved backward and forward. By making the hole in the lug larger than the pin *c* sufficient looseness of the joint will be produced to allow the free end of the gang to move vertically. Any other flexible joint having similar capabilities may be used instead, however, without departing from my invention. Rearwardly-extending bars D are secured at their foreward ends to some portion of the main frame, preferably to the pole, and curved backward to correspond with the sweep of the free ends of the disk-gangs. When the disk-gangs lie in a horizontal plane their free ends are in contact with the under side of the bars D, and further upward movement of said ends of the gangs is thereby prevented; but they are permitted to drop downward below said bars so as to enter a dead-furrow.

When the harrow is in operation, the gangs must necessarily be set at an angle to the line of progression, as represented by dotted lines in Fig. 1, and when in such position the pressure of the earth on the face of the disks causes the inner ends of the gangs to press toward each other. It is therefore desirable that some means be provided for resisting said endwise pressure of the gangs. By curving the bars D, as shown, and allowing some portion of the disk-gang—such as the standard G—to bear against the side of the bars D, the endwise pressure of the gangs will be resisted by said bars when the gangs are set at any desired angle to the line of progression. I have shown the ends of the bars D as engaging with a slot *g*, formed in the standard G, the slot being lengthened so as to permit the free end of the gang to drop downward, for the purpose already described. I do not desire to be limited, however, to such specific construction of that portion of the disk-gang which comes in contact with the arms D. Draft-rods J connect the free ends of the gangs with a lever L, mounted on the pole A, and provided with a spring-actuated latch which engages with a notched segment S.

What I claim is—

1. The combination, with a main frame, of disk-gangs movable vertically and laterally independently of said frame, and rearwardly-extending bars curved to correspond with the sweep of the disk-gangs and arranged so as to limit an upward but permit a downward movement of the free ends of said gangs, substantially as shown and described.

2. The combination, with a main frame, of disk-gangs pivoted to the main frame in rear thereof, rearwardly-extending bars curved to correspond with the sweep of the free ends of the disk-gangs and adapted to bear laterally against standards secured to the free ends of said gangs, and draft-rods connecting the free ends of the gangs with a lever mounted on the main frame, substantially as shown and described.

In testimony whereof I affix my signature in presence of two witnesses.

ROBERT W. HARDIE.

Witnesses:
   CHAS. H. MILLS,
   CHAS. F. BRIDGE.